US005796100A

United States Patent [19]

Palermo

[11] Patent Number: 5,796,100

[45] **Date of Patent: *Aug. 18, 1998**

[54] QUADRUPOLE ION TRAP

[75] Inventor: Stephen Palermo, Livermore, Calif.

[73] Assignee: Hitachi Instruments, San Jose, Calif.

[ * ] Notice: The term of this patent shall not extend beyond the expiration date of Pat. No. 5,629,519.

[21] Appl. No.: 682,983

[22] Filed: Jul. 16, 1996

Related U.S. Application Data

[63] Continuation of Ser. No. 597,677, Jan. 16, 1996, Pat. No. 5,629,519.

[51] Int. Cl.[6] ..... B01D 59/44; H01J 49/00

[52] U.S. Cl. ..... 250/292

[58] Field of Search ..... 250/281, 288, 250/292, 291, 290

[56] References Cited

U.S. PATENT DOCUMENTS

| | | | |
|---|---|---|---|
| 3,187,179 | 6/1965 | Craig et al. . | |
| 3,553,451 | 1/1971 | Uthe | 250/292 |
| 3,626,179 | 12/1971 | Cohen | 250/41.9 |
| 3,852,595 | 12/1974 | Aberth | 250/288 |
| 4,032,782 | 6/1977 | Smith et al. | 250/292 |
| 4,359,661 | 11/1982 | Mitrofanov | 313/93 |
| 4,779,107 | 10/1988 | Weisfield et al. | 349/159 |
| 5,055,678 | 10/1991 | Taylor et al. | 250/292 |
| 5,323,110 | 6/1994 | Fielden et al. | 324/309 |
| 5,384,461 | 1/1995 | Jullien et al. | 250/292 |
| 5,629,519 | 5/1997 | Palermo | 250/292 |
| 5,633,497 | 5/1997 | Brittain et al. | 250/292 |

*Primary Examiner*—Bruce Anderson

*Attorney, Agent, or Firm*—Peninsula IP Group; Douglas A. Chaikin, Esq.

[57] ABSTRACT

Disclosed herein is a three dimensional quadrupole ion trap for analyzing samples. The ion trap includes a pair of opposing end cap electrodes which define a cavity and an axis between them. The ion trap includes a ring electrode attached between the end cap electrodes and circumscribing the axis. Each of the end cap electrodes and ring electrodes are made from Molybdenum to minimize chemical reactivity and to resist thermal deformation.

29 Claims, 7 Drawing Sheets

QUADRUPOLE ION TRAP

This application is a continuation of U.S. patent application Ser. No. 08/597,677, filed Jan. 16, 1996, now issued as U.S. Pat. No. 5,629,519.

BACKGROUND OF THE INVENTION

1. Field of the Invention

This invention relates generally to analysis of chemical compounds by a gas chromatograph (GC). In particular, this invention relates to the analysis of certain organochlorinated chemical compounds by a gas chromatograph with a three dimensional quadrupole ion trap mass spectrometer as its detector.

2. Background

For many years it has been commonplace to analyze chemical compounds through the use of a mass spectrometer. More recently, quadrupole ion trap mass spectrometers have been used. In a ion trap such as that disclosed in U.S. Pat. No. 5,055,678 a heated sample is injected into a cavity defined by a plurality of electrodes. The sample is ionized and then analyzed in the ion trap.

It is clearly critical that the electrodes not react with the sample being analyzed in the ion trap. Once a reaction takes place, it will corrupt the sample and therefore the analysis will be less than credible.

In the analysis of typical chemical compounds the electrodes of an ion trap do not react to any noticeable extent with the sample. However, certain organochlorinated compounds used in pesticides have the effect of causing a reaction with electrodes now in use. As will be demonstrated below, with reference to FIGS. 2–18, this reaction has the effect of certain tailings which corrupt the ionized sample and do not allow proper analysis.

Organochlorinated compounds such as Lindane, Methoxychlor and Parathion are among the most hazardous chemicals known to mankind. Even in small amounts such chemicals are extremely hazardous and fatal to human beings and other living creatures. Even moderate concentrations or the fear of the same has closed highways, shut down industries, killed rivers and streams. It is therefore critical that such chemicals be easily and reliably detected. Unfortunately, until recently and for many years prior, there have been difficulties in detecting and analyzing such chemicals because of their corrosive and destructive nature.

Typical electrodes now used in an ion trap are made from stainless steel. While testing typical compounds, the stainless steel electrodes have proven serviceable. However, when used with the organochlorinated compounds noted herein, the electrodes do have a marked tendency to chemically react.

Improvements in the electrodes have been attempted. For example, in the above noted U.S. Patent, the stainless steel electrodes were coated with chromium or oxidized chromium surface. However, even using such electrodes, it has been found that the samples containing organochlorinated compounds have been degraded and the analysis corrupted. With both chromium and stainless steel surface materials, various chemical compounds including pentachlorophenol, lindane and methoxychlor exhibit chromatographic tailing and chemical reactivity.

What is needed is an ion trap that does not chemically react with organochlorinated compounds such as those commonly found in pesticides. Additionally, what is needed is an ion trap which does not produce chromatic tailing with the same samples.

Thermal expansion is also a limitation of ion traps having stainless steel electrodes and components. It is well known that for a typical 300 series stainless steel, the coefficient of thermal expansion is approximately 0.009 inches/inch at 500° C., for example. In an ion trap having an ion trap flange having hollow posts with a length of 4.3 inches, there is an estimated expansion of 0.387 inches of linear expansion. What is desired is an ion trap which is fabricated from a chemically non-reactive material having a coefficient of thermal expansion of less than 0.009 inches/inch @500° C.

The end caps of stainless steel end cap electrodes and ring of ring electrodes will expand in response to heating. It is estimated that a ring electrode having a 2.6 inch diameter 300 series stainless steel disk will have a radial expansion of approximately 0.0234 inches at 500° C. Such thermal expansion alters the electrical field within the ion trap and thereby reduces the stability of the ion trap (e.g. decreases the stability of ion trajectories within the trap). What is desired is an electrode fabricated from a chemically non-reactive material having a low coefficient of thermal expansion.

SUMMARY OF THE INVENTION

It is an object of this invention to provide an ion trap which does not markedly degrade samples when testing organochlorinated compounds commonly found in pesticides.

It is an additional object of this invention to provide such an ion trap which produces reliable analysis of such compounds.

It is an additional object of this invention to provide an ion trap wherein the electrodes are fabricated from a material which does not degrade the unknown sample when the sample is one of the organochlorinated compounds commonly found in pesticides.

In accordance with the above objects and those that will be mentioned and will become apparent below, the ion trap in accordance with the present invention comprises:

an ion trap including at least two spaced apart end cap electrodes, the end caps being generally opposed to one another and defining a first axis between them;

the ion trap including a ring electrode between the end cap electrodes and surrounding the first axis;

each of the end caps and ring electrodes being made from Molybdenum;

the ion trap having a cavity defined by the end caps and ring electrodes;

a sample injector for injecting the sample into the cavity;

an rf source for filtering the ions of the sample; and a DC source for selectively accelerating the filtered ions into an analyzer, whereby the sample is injected into a cavity of electrodes made from Molybdenum for analysis of the sample.

In a preferred embodiment of the ion trap in accord with the invention, the electrodes and each of them are made from 99.5% Molybdenum pure. It will be appreciated that the electrodes could also be made from 99.00% to 99.99% Molybdenum within the spirit and scope of this invention.

The ion trap in accordance with this invention generally provides a non-reactive environment. Molybdenum is a refractory metal of extreme hardness. Under normal test conditions the electrodes are non-reactive with organochlorinated compounds. Consequently, when testing such chlorinated compounds such as Lindane, Methoxychlor, and Parathion highly accurate and reliable analysis can be achieved. As noted above, when these samples are tested in conventional ion traps, they exhibit chemical reactivity. The chemical analysis of such other gas chromatographs shows chromatic tailing and chemical degradation.

Other large organic ions such as the ones found in metabolites and drug residual traces are sensitive to chromatic tailing and chemical degradation in reactive environments such as stainless steel ion traps. The low concentrations of such large organic ions require an ion trap that provides a non-reactive refractory surface devoid of volatile contaminants and stable over changes of temperature. The Molybdenum electrode ion trap provides a non-reactive environment. Molybdenum with a low vapor pressure does not evaporate into the cavity at the testing temperatures and pressures; consequently the chemical integrity of the sample compounds is not altered. Molybdenum, being a refractory metal does not change its crystalline structure during the cycling temperatures to which the ion trap is subjected under normal operation; consequently the very polar compounds being tested do not exhibit even the temporary physical bonds observed in the commonly used stainless steel traps.

It is also an advantage to make the ion trap electrodes of a single material. This prevents the formation of alternate alloys on the surface of the ion trap. In time, alternate alloys will build up on a chromium plated or coated electrode. The alternate alloy will increase in concentration the longer it is used for testing, especially when testing the organochlorinated compounds targeted by the instant invention. These alternate alloys may ultimately provide a sticky surface unless periodically cleaned. Cleaning is expensive and time consuming. Additionally, there will be considerable down time for the entire system because the ion trap is not available unless the cleaning is done on the premises. Additionally, and again over time, the alternate surface is likely to release free volatiles into the ion trap. These free volatiles will decompose or at the very least degrade the sample, corrupting the analysis of the organochlorinated compound samples.

BRIEF DESCRIPTION OF THE DRAWING

For a further understanding of the objects and advantages of the present invention, reference should be had to the following detailed description, taken in conjunction with the accompanied drawing, in which like parts are given like reference numerals and wherein.

DETAILED DESCRIPTION OF THE INVENTION

Figure 1:
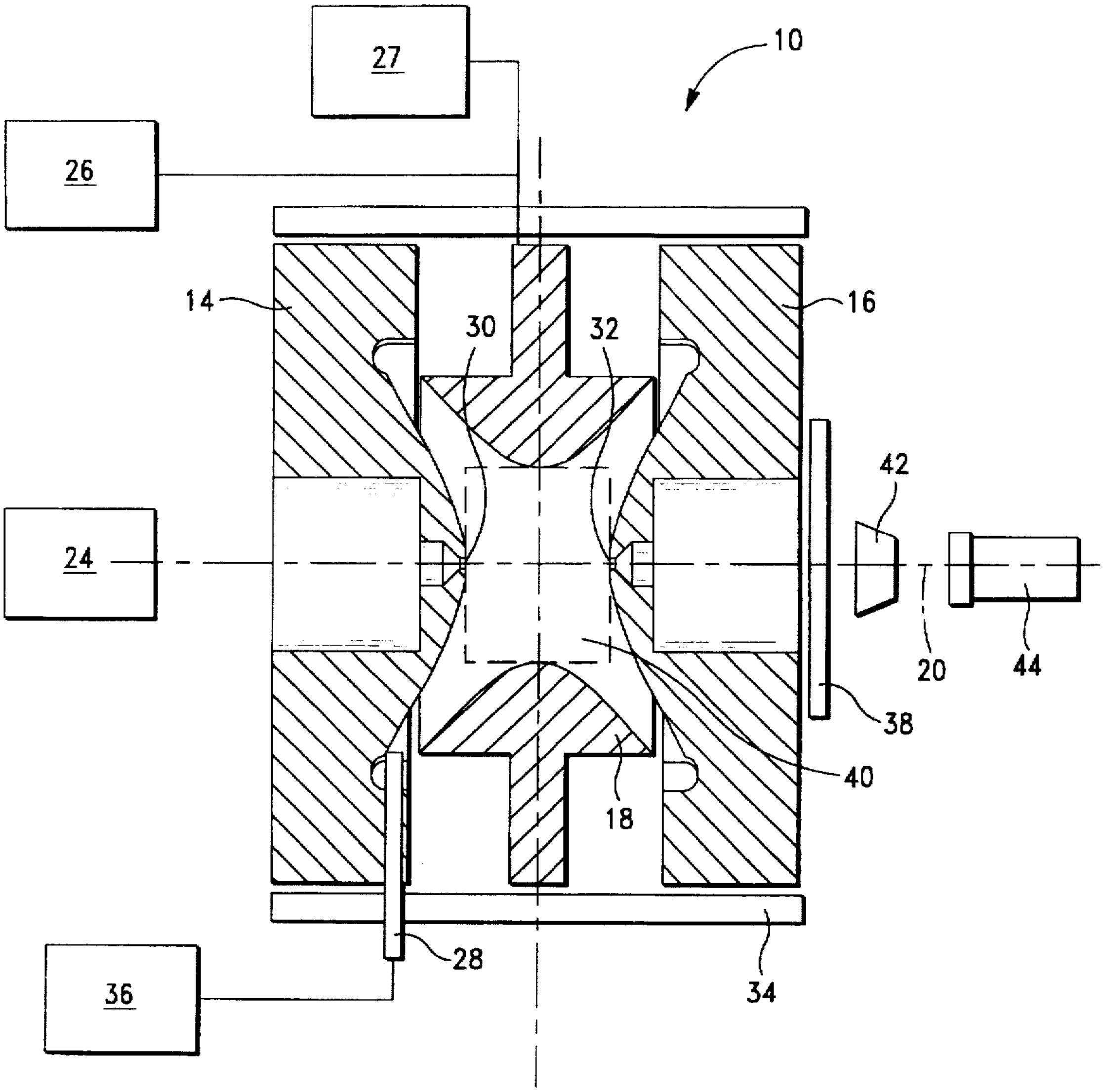
FIG. 1 is a schematic view a three dimensional quadrupole ion trap in accordance with the present invention shown in partial cross section, wherein the ion trap includes electrodes made from Molybdenum.

The invention will now be described with respect to FIG. 1, which illustrates a preferred embodiment of the invention, a three dimensional quadrupole ion trap, shown generally by the numeral 10. The ion trap 10 includes two spaced apart end cap electrodes 14 and 16. The end cap electrodes 14 and 16 are generally opposed to one another and define a cavity 40 and an axis 20 between them.

The ion trap 10 includes a ring electrode 18 between the spaced apart end cap electrodes 14 and 16 surrounding the first axis 20. In the preferred embodiment shown in FIG. 1, the first axis 20 bisects the end cap electrodes 14 and 16 and the ring electrode 18 surrounds the first axis 20 and is equidistant around the first axis. In this way the first axis 20 divides each of the electrodes, 14, 16 and 18 symmetrically. In the preferred embodiment, the ring electrode 18 is a solid ring. It will be appreciated that other ring electrodes may be used within the spirit and scope of this invention. Such ring electrodes include electrodes having slits and which are segmented.

Together, the end cap electrodes 14 and 16 and the ring electrode 18 have an interior space defining an ion trap cavity 40. The electrodes 14 and 16 together define a hyperbolic cross-sectional shape which defines the cavity 40. As will be appreciated more fully hereinafter, ionization of a sample generally occurs within the cavity 40.

The two end cap electrodes 14 and 16 and the ring electrode 18 are made substantially from Molybdenum. One benefit of Molybdenum electrodes is that Molybdenum is significantly less reactive with organochloronated compounds than electrodes having stainless steel or chromium electrode surfaces. Another benefit of Molybdenum electrodes is that Molybdenum has a significantly lower coefficient of thermal expansion compared with stainless steel.

In one embodiment, the end cap electrodes 14 and 16 and the ring electrode 18 are fabricated having a coefficient of thermal expansion of less than 0.0030 inches/inch at normal operating temperature. In a variation of this embodiment, the coefficient of thermal expansion is less than 0.0025 inches/inch. In one embodiment the coefficient of thermal expansion is approximately 0.0025 inches/inch. "Approximately" as used and claimed herein is defined as +/−10% of the approximated value.

Minimizing the coefficient of thermal expansion minimizes deformation of the ion trap cavity 40 and minimizes undesired fluctuation in electrical fields present in the cavity 40. Accordingly, the trajectory of ions in the ion trap are undisturbed to the degree required for making meaningful ion density measurements.

The electrodes, 14, 16 & 18 are made from between 99.00%–100% Molybdenum to achieve, among other things, proper thermal expansion characteristics. Preferably, the electrodes 14, 16 and 18 may be made from Molybdenum in the range from 99.40% to 99.60%. More preferably, the ion trap 10 includes electrodes fabricated from 99.50% Molybdenum. It can be appreciated, however, that various metals or composites having an acceptable thermal coefficient may be used instead of, or in conjunction with Molybdenum in accordance with the present invention.

The ion trap 10 includes an electron source 24 and an opening 30 through the end cap 14 and a sample inlet 28. The sample inlet 28 receives samples to be analyzed. The sample inlet 28 permits the sample to enter the cavity 40 a sample inlet 28 for ionization of the sample.

The electron source 24 projects a electron beam through the opening 30 for ionization of the sample.

The end cap 16 defines an opening 32. Ion optics 38 align behind the opening 32. The opening 32 is aligned diametrically opposite the electron source 24 to facilitate direction of ions from the cavity 40 through the ion optics 38. Thereby, the ion optics 38 guides the ions from leaving the cavity 40 so that they can be analyzed.

The ion trap 10 includes a plurality of heater units 34 to maintain the ion trap 10 at a desired temperature, preferably at 150°–300° C.

The ion trap 10 includes a gas chromatograph 36 to separate sample components. The gas chromatograph 36 has a glass column is 30 m long with an inside diameter of 0.25 mm. The initial time is 1 min. and the final time is 20 min. The initial temperature is 50° C. with a final temperature of 300° C. The carrier gas is Helium with a flow rate of 1 ml/min. In the gas chromatograph 36, the sample is separated into its components by their order of volatility creating a gradient of compounds at the set temperatures versus time. A flow of Helium gas along the glass column of the gas chromatograph carries the sample components to the sample inlet 28. At sample inlet 28, the sample components enter the ion trap 10. The heater units 34 maintain the sample inlet 28, in particular and the quadruple ion trap 10 generally at 150° C. to 300° C.

Before entering the cavity 40, the test sample is injected into the gas chromatograph 36. The sample then flows through the inlet 28 and is injected into the cavity 40 via an injector at sample inlet 28. Once in the cavity 40, the sample is contained within the Molybdenum walls of the end cap electrodes 14 and 16 and the ring electrode 18. The electron source 14 emits an electron beam through the opening 30 in the end cap electrode 14. The electron beam ionizes the sample.

An rf source 27 connected to the ring electrode 18 generates a radio frequency between the ring electrode 18 and the end cap electrodes 14 and 16 in the cavity 40 creating a quadrupole electrical field.

A DC voltage source 26 connected to the end cap electrodes 14 and 16 generates a voltage from the end cap electrodes 14 and 16 into the cavity 40. A combination of electrical parameters and geometric parameters of electrodes 14, 16 and 18 define a field in which the trapped ions can maintain a stable trajectory within a central region of the cavity 40.

The ions are then extracted by a focusing element 42 which consists of an electrostatic lens and static deflector as is standard in the art. The electrostatic lens and the deflector are fabricated from molybdenum. The ions are focused into an ion analyzer 44. The ion analyzer 44 amplifies the signal of the striking ions, then sends the signal through a voltage multiplier (not shown) and an electronic decoder (not shown) to identify the ion mass obtained.

The performance of the invention will now be described with respect to FIGS. 2 to FIG. 18, where the Organochloride Pesticide Mixture PPM-525-1 EPA standard is tested for identification of its components. The test runs where done under comparative conditions in parallel systems of gas chromatograph/Molybdenum ion trap/Mass spectrometer analyzer and a gas chromatograph/stainless steel ion trap/ Mass spectrometer Analyzer system. The parameters were controlled so as to remain constant in both systems and the results are discussed with respect to FIGS. 2–18 below.

Organochloride Pesticide Mixture PPM-525-1 is a mixture of the following components: Alachlor; Aldrin; atrazine; gama-BHC (lindane); alpha-chlordane; gamma-chlordane; endrin, heptachlor; heptachlor epoxide (isomer A); methoxychlor; trans-nonachlor; simazine; are included in 100 µg/ml in methanol. The PPM-525-1 mixture is further diluted into 10 ng per component per run.

Figure 2:
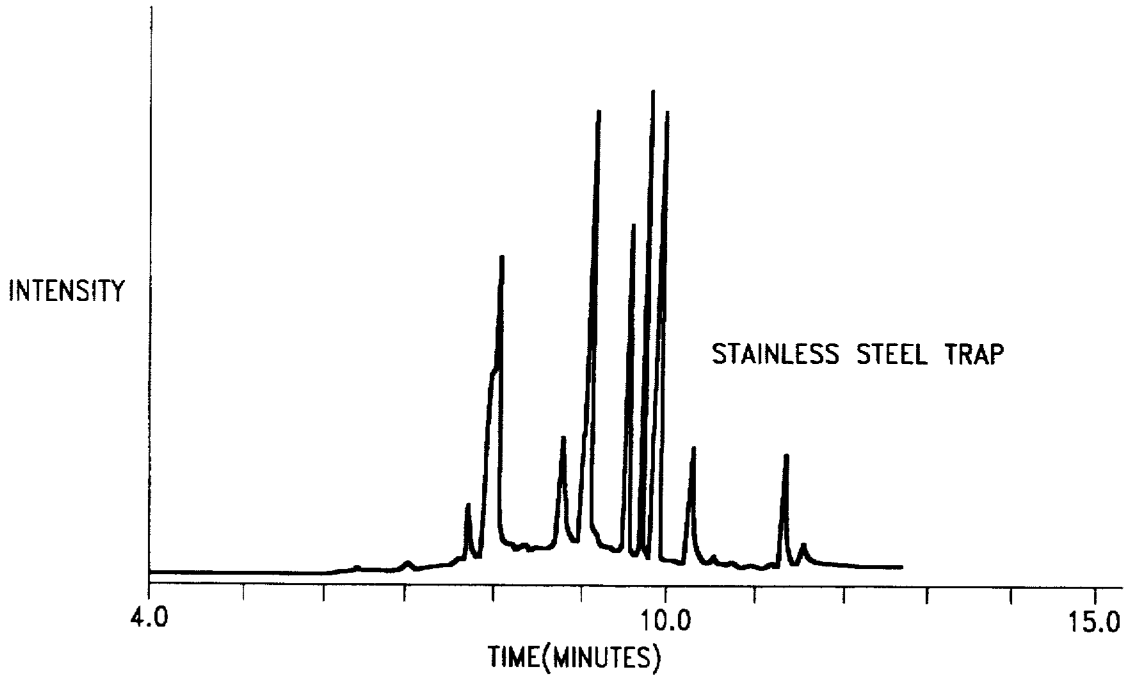
FIG. 2 is a typical total ion chromatograph of an Organochlorine Pesticides Mixture PPM-525-1 EPA sample generated after analysis in a stainless steel ion trap.

With respect to FIG. 2, there is shown the total ion chromatogram (T1C) of PPM525-1 in a stainless steel ion trap. As shown clearly, the base line in FIG. 2 does not maintain a constant level. The lack of constant level for the base line is caused by the surface retention of organochlorinated compounds in the stainless steel Ion trap.

In addition to failing to maintain a constant base, it will be appreciated that FIG. 2 clearly illustrates chromatic tailing. The ion mass peaks being the signature of the PPM-525-1 mixture are clearly followed by a series of peaks which are not part of the signature of the PPM-525-1 mixture. This defines chromatic tailing. The chromatic tailing of the stainless steel ion trap demonstrates dramatically that compounds other than PPM-525-1 mixture are sticking to the surface of the ion trap electrodes, corrupting the analysis.

Figure 3:
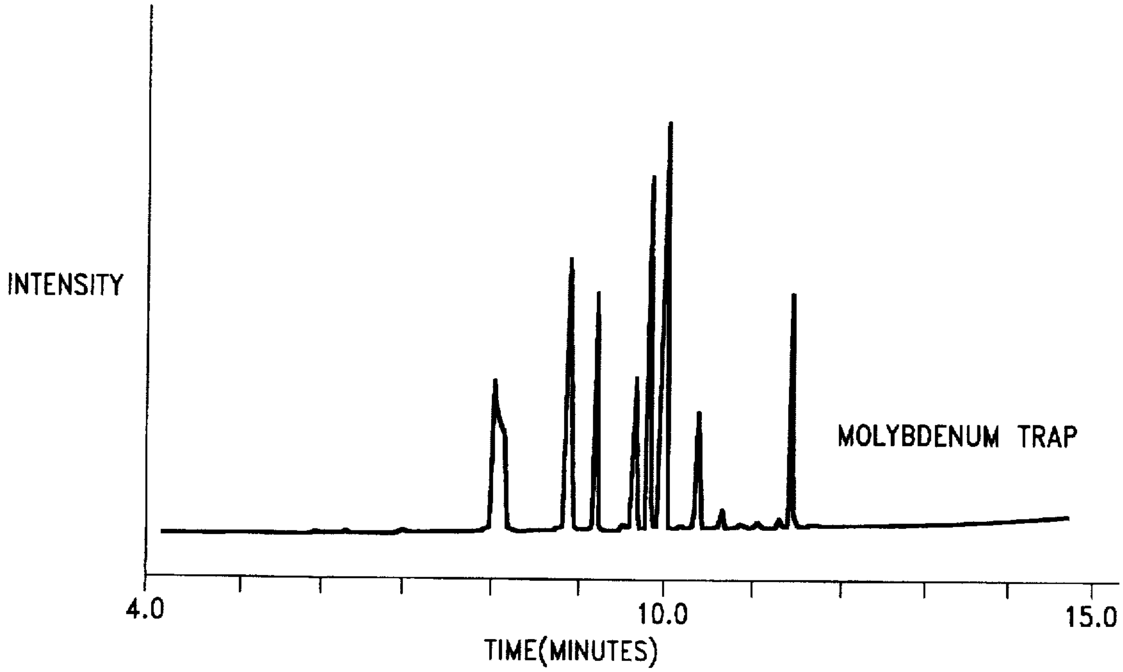
FIG. 3 is a typical total ion chromatograph of an Organochlorine Pesticides Mixture PPM-525-1 EPA sample generated after analysis in the ion trap of FIG. 1.

FIG. 3 illustrates a total-ion chromatogram (T1C) of the same PPM-525-1 in the ion trap 10. In contrast to the stainless steel trap, the base line for the ion trap 10 is maintained. The level base line of FIG. 3 means that the surface of the Molybdenum electrodes 14, 16 and 18 remain clean between the arrival of successive ion masses to the ion analyzer 44.

This comparative run in the ion trap 10 is performed at a greater resolution on the intensity parameter, clearly showing the absence of chromatic tailing in the equivalent time coordinate for ion mass regions at 7.74, 8.58, 9.7 and 11.12 minutes. The close of the intensity at this level clearly shows that the ion trap 10 maintains a stable base line compared with the irregular base line of the stainless steel trap of FIG. 2.

Additionally, the total-ion chromatogram of FIG. 3 shows clean peaks, while the stainless steel trap has somewhat fuzzy peaks. This again points out that the ion trap 10 does not permit surface retention, while the stainless steel trap does.

FIG. 4 to FIG. 18 show the mass spectra graphs of selected compounds from the PPM-525-1 mixture tested by the ion trap 10, the stainless steel ion trap and compared to the NIST standard compound signature template. The spectra are compared to pinpoint regions where extraneous ion mass signals are found, indicating the result of chemical degradation of the sample.

Figure 4:
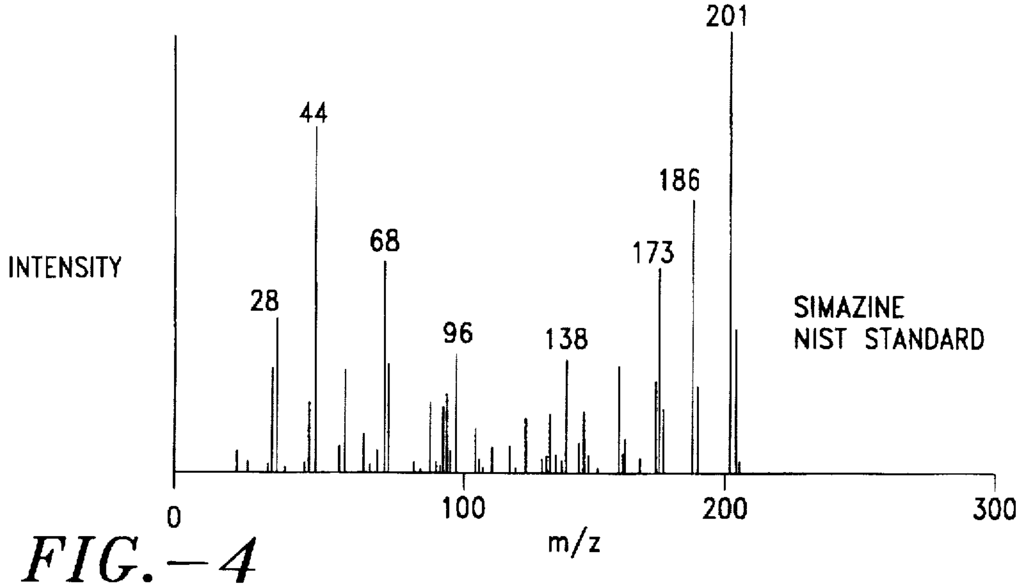
FIG. 4 is a mass spectrum of a Simazine sample according to NIST standards.
Figure 5:
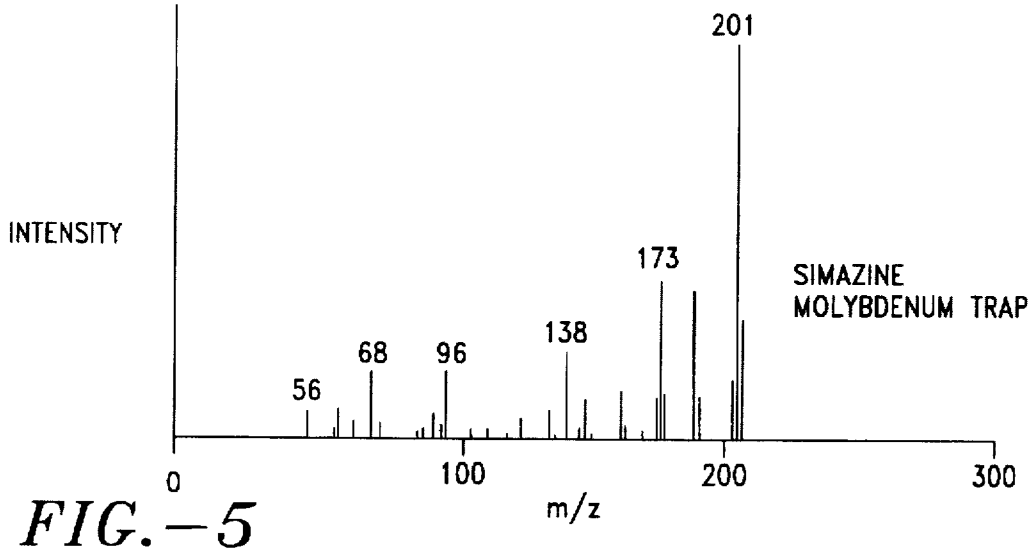
FIG. 5 is a mass spectrum of a Simazine sample in the ion trap of FIG. 1.
Figure 6:
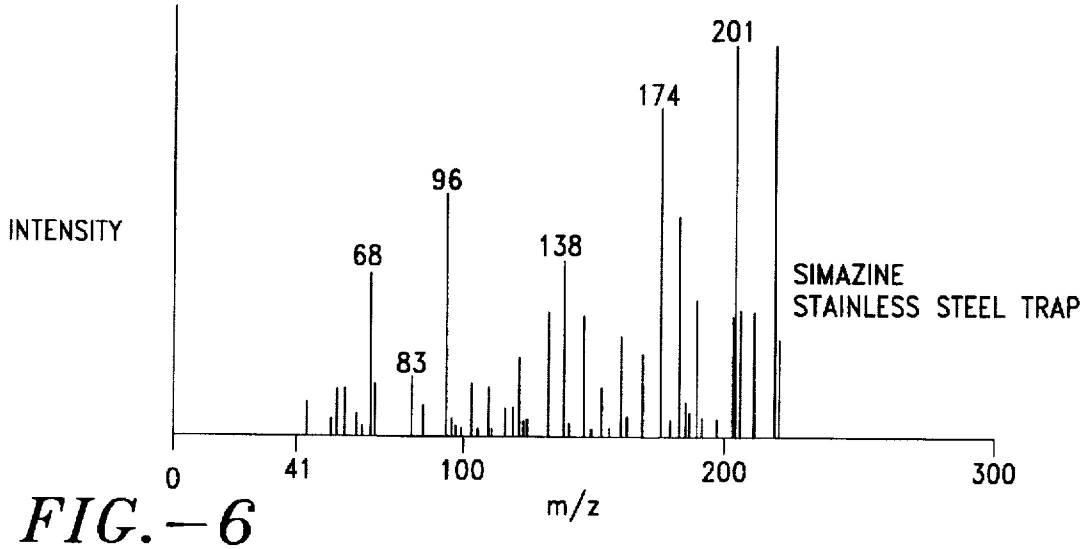
FIG. 6 is a mass spectrum of a Simazine sample in a stainless steel ion trap.

With particular respect to FIGS. 4–6, there is shown the mass spectra of Simazine according to the NIST standards, and after analysis in the ion trap 10 and the stainless steel trap, respectively. The chemical composition of Simazine is 1,3,5-triazine-2,4-diamine,6-chloro-n'n'-diethyl or $C_7H_{12}ClN_5$ with a molecular weight of 201 Dalton. For purposes of this comparison the base was set at 201 m/z.

The ion trap 10 shows a pronounced peak at 201 m/z which corresponds to the template of the NIST standard. The stainless steel trap yields a spectrum shown in FIG. 6 which has added ion masses. This most clearly seen at the 220 m/z, and 174 m/z of FIG. 6.

Figure 7:
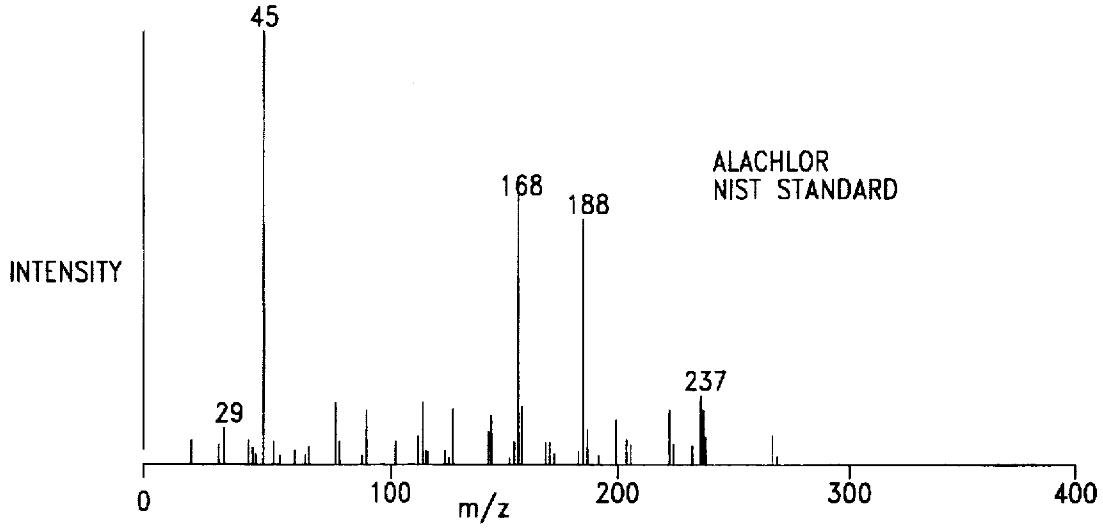
FIG. 7 is a mass spectrum of an f-Alachlor sample according to NIST standards.
Figure 8:
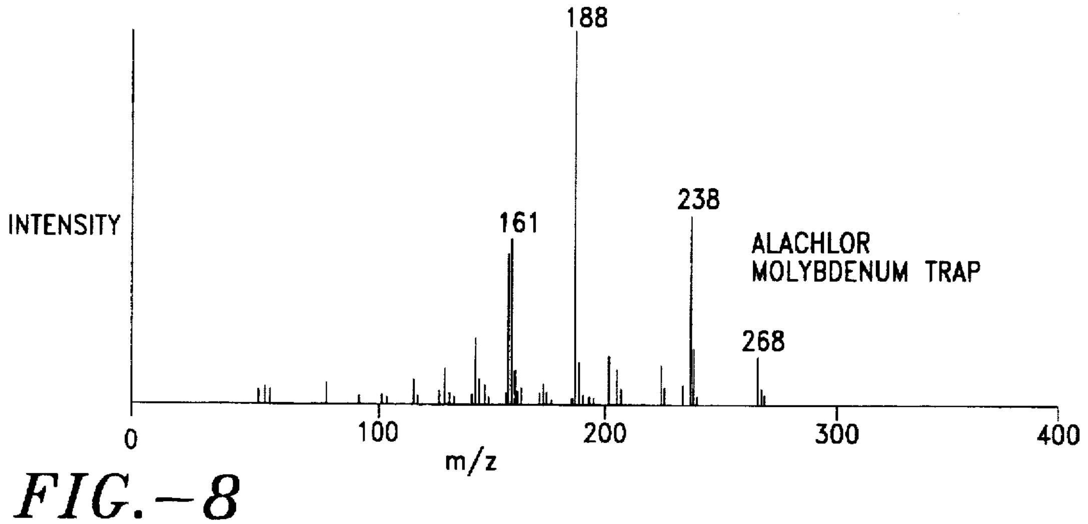
FIG. 8 is a mass spectrum of an f-Alachlor sample in the ion trap of FIG. 1.
Figure 9:
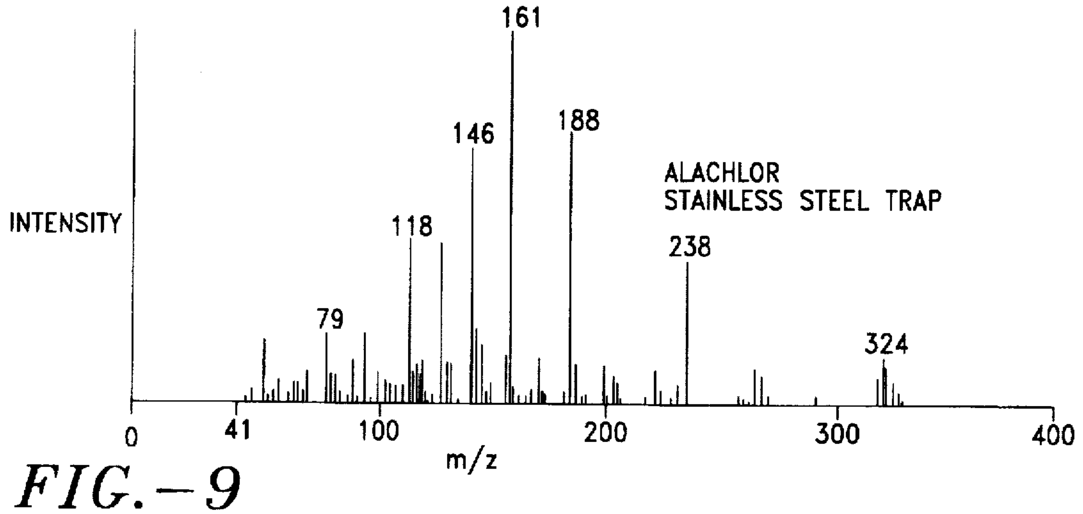
FIG. 9 is a mass spectrum of an f-Alachlor sample in a stainless steel ion trap.

With particular respect to FIGS. 7–9, there is shown the spectra of alachlor according to the NIST standards, and after analysis in the ion trap 10 and the stainless steel trap, respectively. The chemical composition of alachlor is $C_{14}H_{20}ClNO_2$ and it has a molecular weight of 269 Dalton. For purposes of this comparison, the base was set at 188 m/z for FIG. 8 and 161 m/z for FIG. 9.

Both FIGS. 8 and 9 show a pronounced peak at 188 m/z corresponding to the NIST standard template. However, FIG. 8 shows the secondary peaks between 200 m/z and 250 m/z corresponding to the NIST standard, while FIG. 9 demonstrates continued inaccuracy and false peaks. The false peaks continue in FIG. 9 and are especially pronounced at the 324 m/z region.

Figure 10:
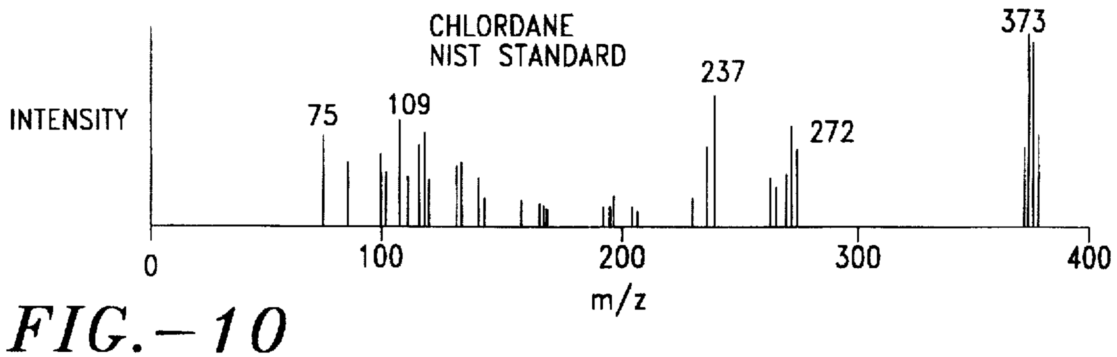
FIG. 10 is a mass spectrum of a Chlordane sample according to NIST standards.
Figure 11:
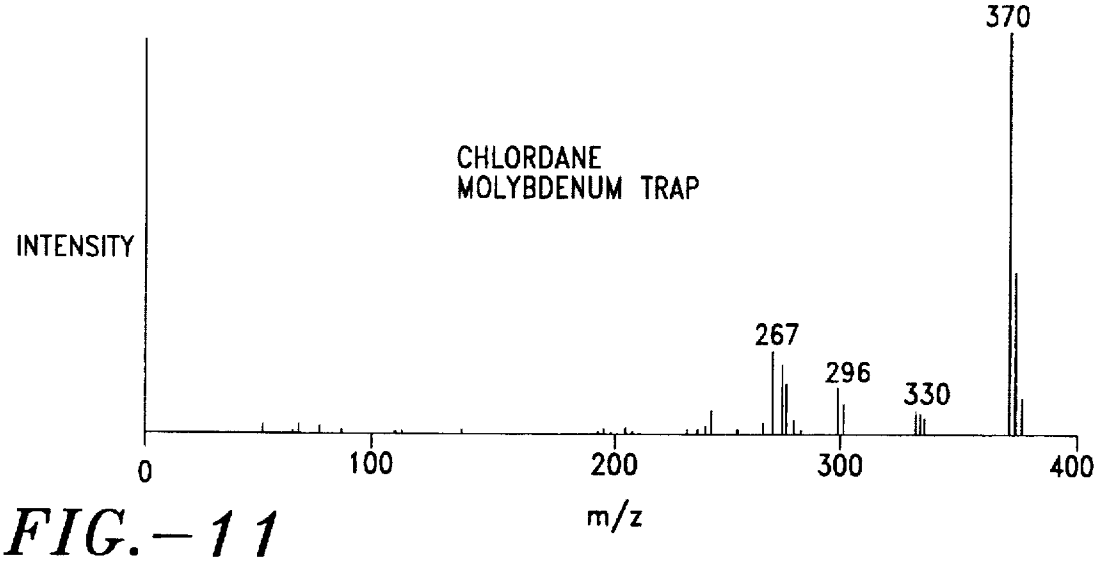
FIG. 11 is mass spectrum of a Chlordane sample in the ion trap of FIG. 1.
Figure 12:
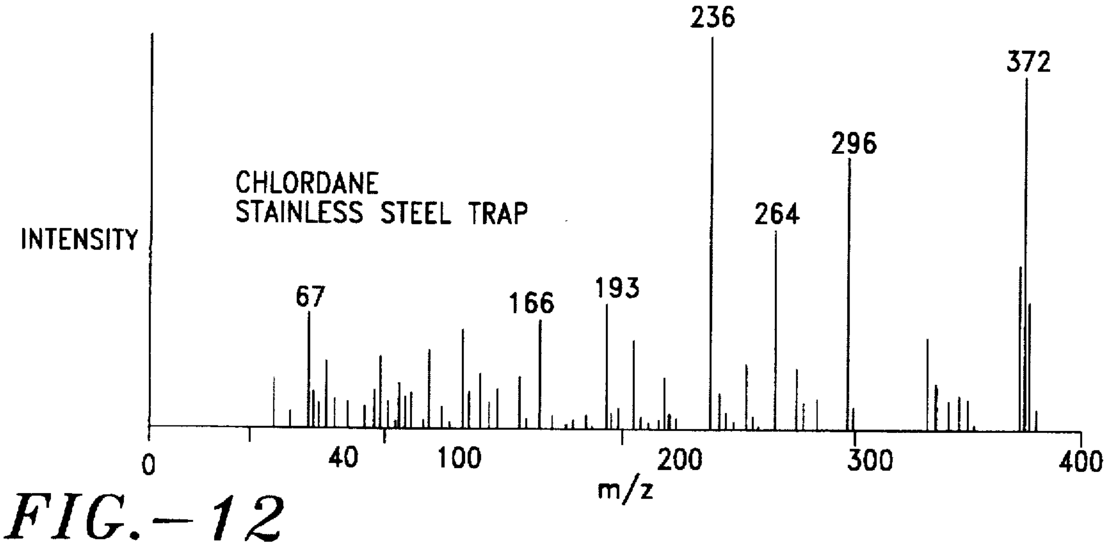
FIG. 12 is mass spectrum of a Chlordane sample in a stainless steel ion trap.

With particular respect to FIGS. 10–12, there is shown the spectra of trans-Chlordane according to the NIST standards, and after analysis in the ion trap 10 and the stainless steel trap, respectively. The chemical composition trans-Chlordane is $C_{10}H_6Cl_8$ and has a molecular weight of 406 Dalton. The base was set at 236 m/z for FIG. 11 and 370 m/z for FIG. 12.

The ion trap 10 spectra of FIG. 11 shows a pronounced peak at 370 m/z following the template of the NIST standard. The stainless steel ion trap spectra of FIG. 12 shows pronounced peaks at 372 m/z,296 m/z 264 m/z and 236 m/z some of which correspond to the NIST standard others of which do not. The NIST sample template shows ion mass peaks at 75, 109, 121, 135, 237 m/z some of these correspond to the stainless steel samples while others do not. Again, the major peaks of the NIST standard template are clearly and cleanly showed by FIG. 11. Again, it is clear that there are extraneous ion mass fragments formed in the stainless steel ion trap.

Figure 13:
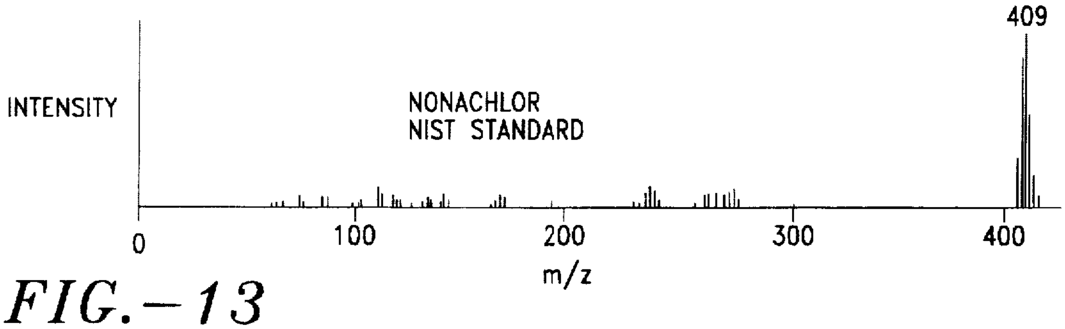
FIG. 13 is a mass spectrum of a Nonachlor sample according to NIST Standards.
Figure 14:
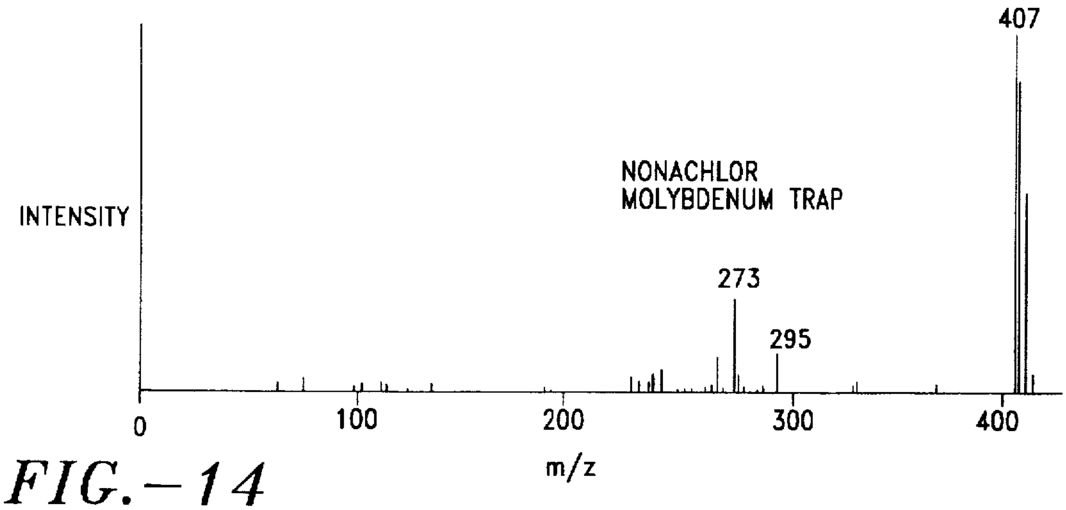
FIG. 14 is a mass spectrum of a Nonachlor sample in the ion trap of FIG. 1.
Figure 15:
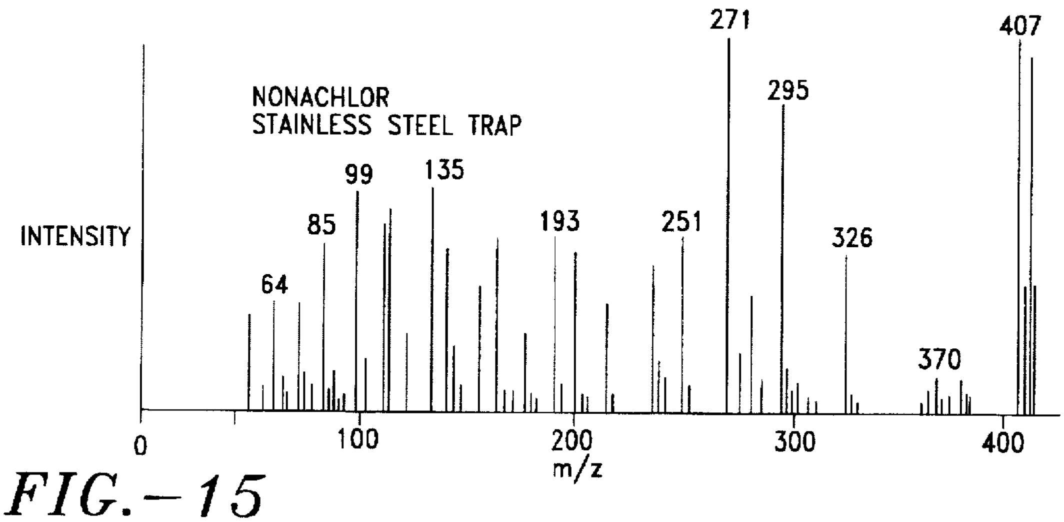
FIG. 15 is a mass spectrum of a Nonachlor sample in a stainless steel ion trap.

With particular respect to FIGS. 13–15, there is shown the spectra of trans-Nonachlor according to the NIST standards, and after analysis in the ion trap 10 and the stainless steel trap, respectively. The chemical composition of trans-Chlordane is C10H5Cl9 and has a molecular weight of 440 Dalton. For purposes of comparison, the base was set at 271 m/z for FIG. 14 and 407 m/z for FIG. 15.

FIG. 14 shows pronounced peaks at 407 m/z which correspond to the NIST standard template. There are additional peaks at 273 and 295 which again correspond to the NIST standard template. It will be appreciated that peaks and valleys of the NIST standard template correspond accurately to the peaks and valleys of FIG. 14, the ion trap 10 mass spectra.

With respect to FIG. 15, there are certainly the important peaks. However, there are so many other peaks that the peaks and valleys of the NIST standard template can not be said to correspond to the mass spectrograph of the stainless steel trap. Again, this indicates a high order of reactivity of the surface of the stainless steel electrodes with the sample The result is a high degree of chemical compound degradation and a corruption of the sample analysis.

Figure 16:
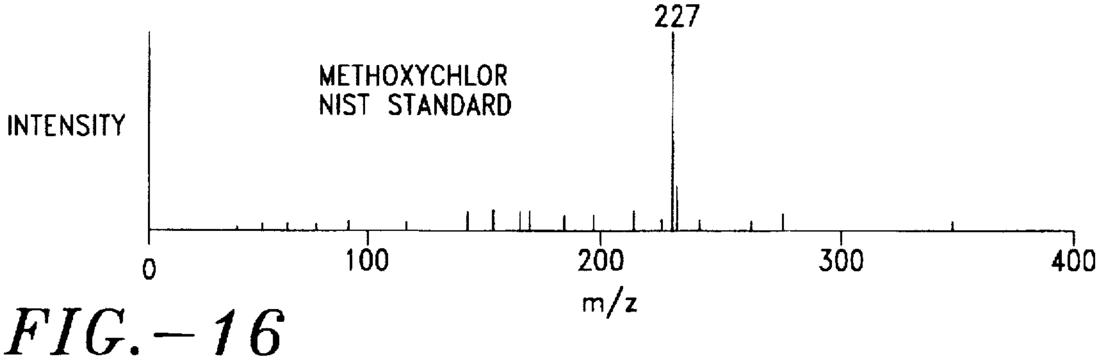
FIG. 16 is a mass spectrum of a Methoxychlor sample according to NIST Standards
Figure 17:
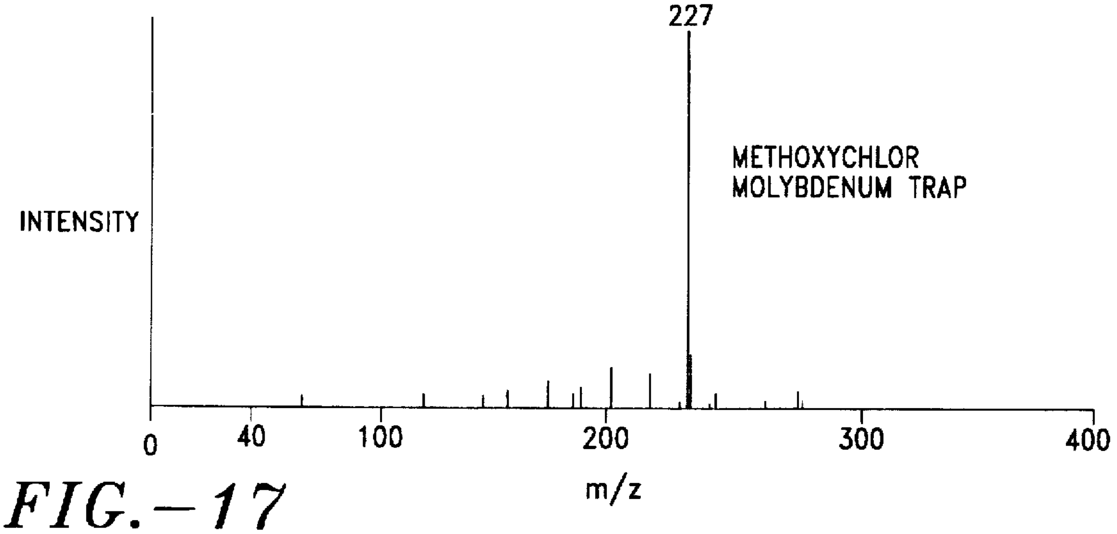
FIG. 17 is a mass spectrum of a Methoxychlor sample in the ion trap of FIG. 1.
Figure 18:
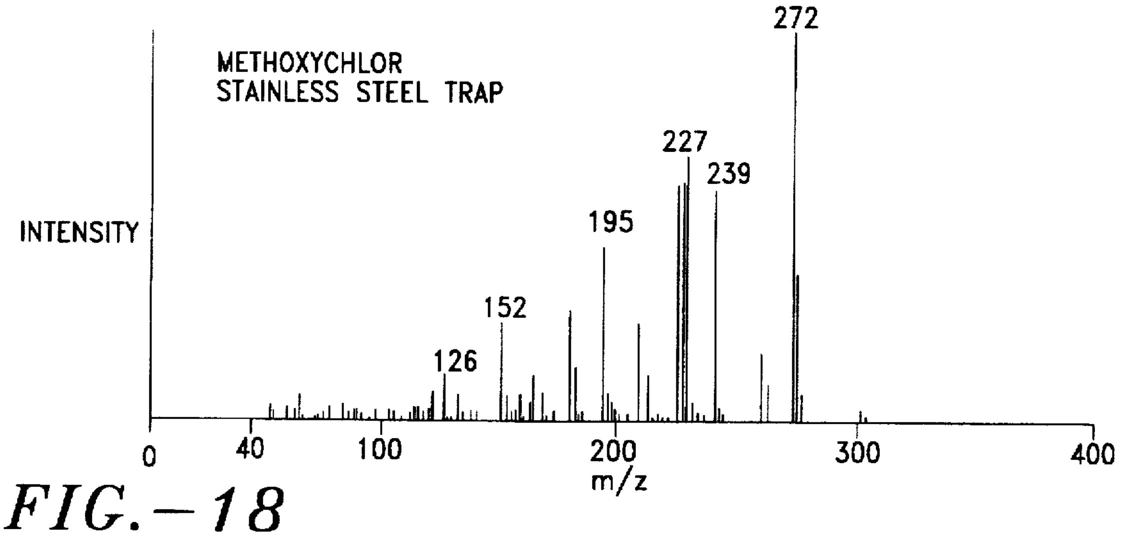
FIG. 18 a mass spectrum of a Methoxychlor sample in a stainless steel ion trap.

With particular respect to FIGS. 16–18, there is shown the mass spectra of Methoxychlor according to the NIST standards, and after analysis in the ion trap 10 and the stainless steel trap electrode, respectively. The chemical composition of Methoxychlor is $C_{16}H_{15}Cl_3O_2$ and has a molecular weight of 344 Dalton. For purposes of comparison, the base was set at 272 m/z for FIG. 17 and 227 m/z for FIG. 18.

The ion trap 10 yield results shown in FIG. 17 with the spectrum having a pronounced ion mass peak at 227 m/z. This matches the template of the NIST standard.

The mass spectrograph shown in FIG. 18 for the stainless steel electrodes likewise shows a signal at 227. However other peak signals are shown at 272 m/z, 239 m/z, 195 m/z, 181 m/z and 126 m/z. Again, the high degree of reactivity of the surface of the stainless steel electrodes produces results reflecting the chemical degradation of the sample due to chemical activity occurring within the ion trap.

It is evident from the comparison of FIG. 2 through FIG. 18 that the Molybdenum electrode ion trap provides a physically and chemically non reactive environment for organochlorinated compounds of large molecular weight. It is also noted that the concentration of components at 10 ng per component per run require an ion trap free of chemical interference.

It will be appreciated that the embodiments discussed above and the virtually infinite embodiments that are not mentioned could easily be within the scope and spirit of this invention. Thus, the invention is to be limited only by the claims as set forth below.

What is claimed is:

1. A three dimensional quadrupole ion trap for analyzing samples, comprising two end cap electrodes attached within the ion trap, the end cap electrodes being generally opposed to one another and defining a first axis between them;

a ring electrode attached within the ion trap between the end cap electrodes and surrounding the first axis, the end cap electrodes and the ring electrode define a cavity therebetween, the electrodes generate an electrical field for ionizing samples in the cavity;

each of the end cap electrodes and ring electrodes having a coefficient of thermal expansion of less than 0.0234 inches/inch at the operating temperature; and a heater for heating the ion trap to an operating temperature.

2. An apparatus as set forth in claim 1, wherein the coefficient of thermal expansion is less than 0.0025 inches/inch at the operating temperature.

3. An apparatus as set forth in claim 1, wherein the end cap electrodes and the ring electrode have a coefficient of thermal expansion of approximately 0.0025 inches/inch at the operating temperature.

4. An apparatus as set forth in claim 1, wherein the operating temperature is less than 500° C.

5. An apparatus as set forth in claim 1, wherein the operating temperature is approximately 300° C.

6. An apparatus as set forth in claim 1, wherein the end cap electrodes consist essentially of Molybdenum to minimize thermal expansion.

7. An apparatus as set forth in claim 1, wherein the end cap electrodes are made from between 99.00% to 100% Molybdenum.

8. An apparatus as set forth in claim 1, wherein the end cap electrodes are made from between 99.40% to 99.60% Molybdenum.

9. An apparatus as set forth in claim 1, wherein the end cap electrodes are made from approximately 99.50% Molybdenum.

10. An apparatus as set forth in claim 1, wherein the ring electrode consists essentially of Molybdenum to minimize thermal expansion.

11. An apparatus as set forth in claim 1, wherein the ring electrode is made from between 99%–100% Molybdenum.

12. An apparatus as set forth in claim 1, wherein the ring electrode is made from between 99.40% to 99.60% Molybdenum.

13. An apparatus as set forth in claim 1, wherein the ring electrode is made from approximately 99.50% Molybdenum.

14. A three dimensional quadrupole ion trap for analyzing samples, comprising;

an ion trap including at least two spaced apart end cap electrodes, the end cap electrodes being generally opposed to one another and defining a first axis between them;

the ion trap including a ring electrode between the end cap electrodes and surrounding the first axis, the ring electrode and the end cap electrodes defining a cavity;

each of the end cap electrodes and ring electrodes consisting essentially of Molybdenum;

a sample injector for injecting the sample into the cavity;

an rf source for filtering the ions of the sample; and a DC source for selectively accelerating the filtered ions into an analyzer, whereby, the sample is injected into a cavity of electrodes made from Molybdenum for analysis of the sample.

15. An ion trap as set forth in claim 14, wherein the electrodes are made from approximately 99.5% molybdenum.

16. An ion trap as set forth in claim 14, wherein the electrodes are made from between 99.00% and 99.99% Molybdenum.

17. An ion trap as set forth in claim 14, wherein the first axis bisects the end cap electrodes and the ring electrode circumscribes the first axis.

18. An ion trap as set forth in claim 14, wherein the first axis divides the end cap electrodes and the ring electrode such that each of the electrodes is symmetrical.

19. A quadrupole ion trap for analyzing samples, comprising two end cap electrodes attached within the ion trap, the end cap electrodes being generally opposed to one another and defining a first axis between them;

a ring electrode attached within the ion trap and being disposed between the end cap electrodes and surrounding the first axis, the end cap electrodes and the ring electrode define a cavity therebetween, the electrodes generate an electrical field for ionizing samples in the cavity;

each of the end cap electrodes and ring electrodes having a coefficient of thermal expansion of less than 0.0030 inches/inch at the operating temperature; and a heater for heating the ion trap to an operating temperature.

20. An apparatus as set forth in claim 19, wherein the end cap electrodes together define a hyperbolic shape which defines a portion of the cavity.

21. An apparatus as set forth in claim 19, wherein a gas chromatograph having an insertion tube attaches to the ion trap, the insertion tube feeds samples into the ion trap.

22. An apparatus as set forth in claim 21, wherein the cavity contains pressurized gas which is pressurized to a pressure greater than 1 atm, the samples collide with the pressurized gas and form ions in the cavity.

23. An apparatus as set forth in claim 22, wherein an electrostatic extractor lens assembly and an analyzer attach to the ion trap, the lens assembly selects the ions for extraction from the cavity and directs the ions to the analyzer, the analyzer analyzes the ion mass extracted.

24. An apparatus as set forth in claim 23, wherein the lens and the analyzer are fabricated from molybdenum.

25. A three dimensional quadrupole ion trap for analyzing samples, comprising:

an ion trap including at least two spaced apart end cap electrodes, the end caps being generally opposed to one another and defining a first axis between them;

the ion trap including a ring electrode between the end cap electrodes and surrounding the first axis;

each of the end caps and ring electrodes being made from Molybdenum;

the ion trap having a cavity defined by the end caps and ring electrodes;

a sample injector for injecting the sample into the cavity;

an rf source for filtering the ions of the sample; and a DC source for selectively accelerating the filtered ions into an analyzer, whereby, the sample is injected into a cavity of electrodes made from Molybdenum for analysis of the sample.

26. An ion trap as set forth in claim 25, wherein the electrodes are 99.5% molybdenum.

27. An ion trap as set forth in claim 25, wherein the electrodes are between 99.00 and 99.99% Molybdenum.

28. An ion trap as set forth in claim 25, wherein the first axis bisects the end cap electrodes and the ring electrode surrounds the first axis being equidistant around the axis.

29. An ion trap as set forth in claim 25, wherein the first axis divides the end cap electrodes and the ring electrode such that each of the electrodes is symmetrical.

* * * * *